April 15, 1969     A. C. MAMO     3,438,458

GROUND EFFECT VEHICLE

Filed March 13, 1961

Inventor:
Anthony C. Mamo
By: Lyle S. Morley
Atty.

United States Patent Office 3,438,458
Patented Apr. 15, 1969

3,438,458
GROUND EFFECT VEHICLE
Anthony C. Mamo, Des Plaines, Ill., assignor to Borg-Warner Corporation, Chicago, Ill., a corporation of Illinois
Filed Mar. 13, 1961, Ser. No. 95,371
Int. Cl. B60v 1/02
U.S. Cl. 180—122                    12 Claims This invention relates to a ground effect vehicle and more particularly a vehicle supported above a surface by a pressurized air mass which is maintained by a regenerative and reactive captive air system.

A ground effect vehicle obtains its support from an entrapt mass or bubble of pressurized air between it and the surface above which it hovers, and the reaction produced by the change of velocity between air entering and air leaving the vehicle. In the past this has been done by a fan rotating about a vehicle axis which draws air through the upper part of the vehicle and directs the air downwardly into a chamber and against the supporting surface beneath the vehicle. Some of the kinetic energy of this air is dissipated on the surface beneath the vehicle and the rest is exhausted from beneath the vehicle and is lost to the atmosphere. A large volume of air is necessary to replace the air lost to the atmosphere which results in a corresponding large volume of air being exhausted adjacent the vehicle. When the vehicle is operated on the ground or water there is a corresponding large area of agitation resulting in great volumes of dust or mist which is an undesirable condition that interferes with the efficient, safe and comfortable operation of the vehicle. This area of agitation can also be damaging to surrounding objects, and it limits the proximity of all other similar craft.

Further, the presently known ground effect vehicles control the direction of movement of the vehicle by louvers or vanes in the sides thereof, or by otherwise releasing the entrapped air through the sides of the vehicle. This situation increases the area of agitation and dissipates the energy needed to support the vehicle. It is therefore highly desirable to provide a ground effect vehicle wherein the area of agitation is the lowest possible and which has a means for steering that will not dissipate high pressure air otherwise needed to support the vehicle. Also, it would be highly desirable to have a ground effect vehicle which could use the kinetic energy of the incoming air to aid in the support of the vehicle.

An object of this invention is to provide a ground effect vehicle which is of improved efficiency and which has an economical construction.

A primary object of this invention is to provide a ground effect vehicle having a regenerative captive air system for supporting the vehicle.

A further object of this invention is to provide a ground effect vehicle having reactive captive air system for suspending the vehicle by recovering some of the kinetic energy of the escaping air.

An additional object of this invention is to provide a ground effect vehicle having a regenerative captive air pressure system for supporting the vehicle wherein a curtain of incoming air is provided to aid in the maintenance of a greater captive air pressure and to minimize the area of agitation caused by exhausted air.

A further object of this invention is to provide ground effect vehicle having a captive air system for supporting the vehicle wherein a selective steering structure is provided which is adapted to vary air inlet pressures, air ram effects and center of lift position in a collective manner so as to provide a selective aggregate steering and propulsive force for the vehicle.

Another object for this invention is to provide a ground effect vehicle having regenerative captive air system for supporting the vehicle wherein the vehicle is provided with fixed starting vents to facilitate initiation of the regenerative system.

Another object of this invention is to provide a ground effect vehicle having a maximum useable cargo space for a given area occupied by the vehicle.

With these and other objects in view, the present invention contemplates a ground effect vehicle having a downwardly opening chamber. An annular duct is formed in the vehicle and has an annular inlet and an annular outlet, both of which open into the chamber. The duct inlet is located adjacent the lower outer periphery of the vehicle chamber and the outlet opening is positioned inwardly therefrom. A fan is provided for circulating the air through the duct. The duct outlet opening is so formed that it directs the air inwardly and downwardly toward the center of the chamber. An omnidirectional steering means is provided which includes a disc or ring slidably mounted on a platform within the chamber. The disc is positionable on the platform for selectively closing a given portion of the duct outlet opening to cause an unbalance in the air circulation which provides a means for steering and propelling the vehicle.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

Figure 1:
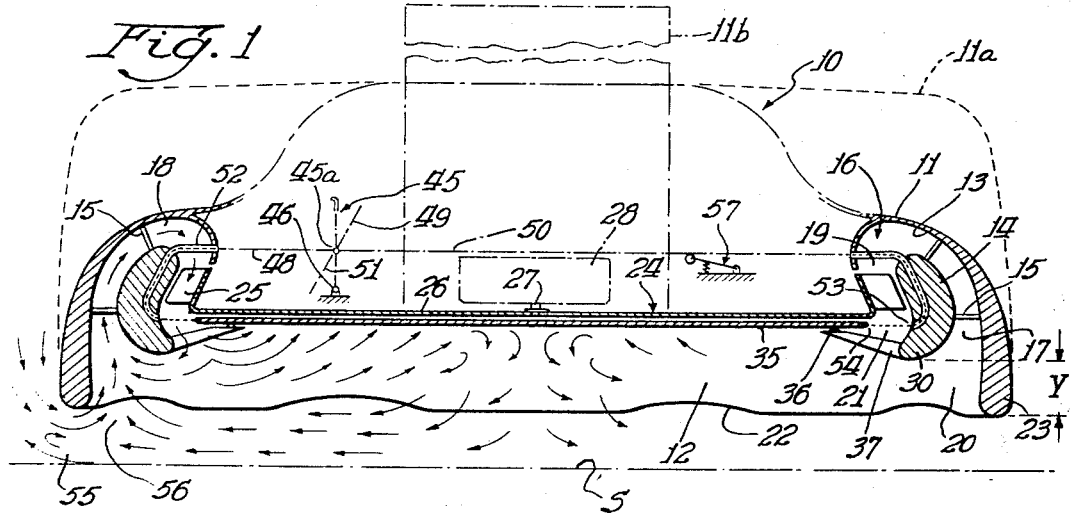
FIG. 1 is a vertical section view taken through the center of the vehicle showing the inter-relationship of the components thereof.
Figure 2:
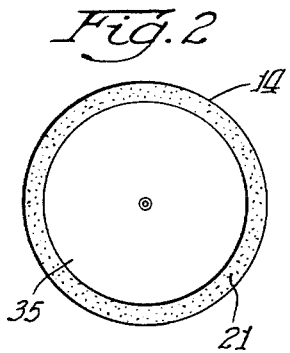
FIG. 2 is a schematic bottom view of the vehicle showing a steering disc which is utilized for steering the vehicle.

Referring to the drawings there is illustrated an exemplary embodiment of applicant's ground effect vehicle generally designated by the numeral 10 (FIG. 1). The vehicle includes an annular body 11 having an annular passageway or grooves 13 formed therein which opens into a chamber 12. An annular core 14 is rigidly supported in the annular passage 13 by means of brackets or stators 15. The vehicle is illustrated in the suspended position above the ground or other reacting surface S (FIG. 1).

The annular core 14 forms a duct, generally designated by the numeral 16, which includes a substantially vertical annular inlet portion 17, a substantially circular annular intermediate upper portion 18 and a substantially vertical inner portion 19. It should be noted that the duct 16 formed by the core 14 and the passage 13 has an annular inlet portion 20 and an annular outlet or exhaust portion 21 spaced radially inward from the inlet 20. Also, the vehicle body 11 has a set of starting vents 22 which are located in a lower peripheral portion 23 of the body 11.

A fan, generally designated by the numeral 24, is provided for drawing air through the duct 16 from the inlet 20 to the outlet 21 and then into the chamber 12 beneath the vehicle to produce a pressurized volume of air for supporting the vehicle and for directing its lateral motion. The fan 24 includes a series of fan blades or impellers 25 attached to a hub 26 which is secured to a shaft 27 of a motor 28. The motor 28 has a conventional speed control means (not shown) and is adapted to rotate the fan 24 about a vertical axes of the annular vehicle body 11 with the blades 25 moving in a portion 19 of the duct 16. It should be noted that the fan is adapted to draw air through the duct 16 from the inlet 20 and direct it downward against a lower inwardly extending portion 30 of the core 14 which will direct the air inwardly and downwardly toward the center of the chamber 12.

The body 11 may be extended horizontally and vertically, as indicated by the broken line 11a, to provide additional cargo space. It should be noted in this regard that applicant's invention provides a maximum cargo space for a given horizontal area displaced by the vehicle. Further, applicant's larger cargo space is unobstructed contrary to the condition prevailing in known types of ground effect vehicles. More particularly, the presently known types of ground effect vehicles utilize a vertical ducted fan which draws air from the upper part of the vehicle and discharges the air directly into a chamber beneath the vehicle. This known type of structure is represented by the broken line 11b (FIG. 1) and clearly illustrates the fact that the presently known types of ground effect vehicles require a vertical duct through the cargo space and that the duct thereby constitutes a large obstruction which disrupts the cargo space.

A steering mechanism is provided for controlling lateral movement of the vehicle and includes, among other things, a disc 35 which is slidably mounted on a set of anti-friction bearings 36. The bearings 36 are secured in a set of diffuser stator brackets 37 and the brackets 37 are rigidly connected to the lower portion 30 of the core 14. It should be noted that the disc 35 is of such a diameter that it leaves the outlet 21 unrestricted when the disc is centrally located within the core 14.

A manipulating means is provided for moving the disc 35 on the anti-friction bearings 36 so as to selectively cover any selected portions of the annular outlet 21 as indicated in FIGS. 2-6.

The manipulator includes a control stick 45 pivotally mounted to the vehicle body 11 by means of a ball pivot 46 so that the stick 45 can be pivoted in any direction. A series of four cables 48, 49, 50 and 51 are pivotally attached to the control stick 45 at 45a. Each of the cables 48-51 extends horizontally from the control stick at a 90° angle from the adjacent cables. Each cable 48-51 passes through a separate tube 52 which extends through the exhaust portion 19 of the duct 16 into the stator 14 to a point 53 adjacent the periphery of the disc 35. Each cable is secured to the periphery of the disc 35 at a respective point 54.

Thus, it can be seen that by pivoting the control stick 45 in any given direction about the pivot 46, the cables 49-51 will move the disc 35 in an opposite direction. The extent and direction of the movement of the disc 35 will therefore depend on the magnitude and direction of the pivotal movement of the control stick 45. The cable attaching point 45a of the control stick 45 will move in an arcuate path about the ball pivot 46 which will result in an uneven tension in the reciprocating cables 48-51. Spring biased rollers, generally designated by the numeral 57, are provided in engagement with the cables 48-51 to overcome the uneven tension and thereby maintain the cables taut.

In operation the motor is started with the lower peripheral portion 23 of the vehicle on the ground or other supporting surface S. The motor will rotate the fan 35 in the duct 16 which will cause air to be drawn in through the starting vents 22 and into the inlet area 20 adjacent the inlet portion 17 of the duct 16. The air will be carried through the duct 16 and exhausted through the outlet 21 in an inward and downward direction towards the center of the chamber 12 (FIG. 1) as additional air is drawn in through the inlet 20 and starting vents 22.

A predetermined amount of the air exhausted from the outlet 21 of the channel 16 will be re-circulated through the channel as indicated in FIG. 1. The amount of air re-circulated depends on dimension Y (FIG. 1). However, inasmuch as the direction of the exhausted air is toward the center of the chamber 12, there will be a vacuum created adjacent the starting vents 22 in the lower peripheral portion 23 of the body causing air to be drawn into the chamber through the vents. Eventually the pressure will be built up within the chamber 12 to a point where the pressure of the air mass within the chamber is sufficient to raise the vehicle to a hovering position immediately above the surface S.

After the vehicle is raised off of the surface S, there will be a tendency for air to escape from beneath the outer lower peripheral portion 23 at 55 (FIG. 1). However, in so doing the air has to pass by the fan inlet 20 where it will be drawn into the fan 24. Therefore, a substantial part of the air will be re-circulated rather than exhausted to the atmosphere. Thus, recirculation of the air contained under the vehicle and the utilization of the radially inward arm effect of the incoming air from without the vehicle combine to maintain a high pressure air mass within the chamber 12.

The channel is so constructed that the momentum of the incoming air plus that of the outgoing air will be expended against the upper curved portion 18 of the duct 16 and thus add significantly to the lifting force applied to the vehicle. In particular, the inlet portion 17 of the duct 16 is substantially vertical and acts to direct the incoming air upwardly, and the outlet portion 19 of the duct 16 is substantially vertical and acts to direct the exhausted air downward into the chamber 12. The change in direction thus provided results in a kinetic impact on the upper surface of the intermediate duct portion 17 resulting in the exertion of a lifting force on the body 11.

The control disc 35 may be moved in any direction by appropriately pivoting the control stick 45 in a direction so that any one of the four general positions of the disc (FIGS. 2-5) or intermediate combinations thereof will be obtained. In the neutral position of the disc (FIGS. 1 and 2) the air provided by the fan will be uniformly exhausted through the outlet 21 into the chamber 12 and will maintain the vehicle 10 in equilibrium so as to prevent it from moving in a horizontal direction along the ground or other reacting surface S. However, if the control stick 45 is pivoted in any one direction so as to cause the disc 35 to move to completely or partially close any selected portion of the annular exhaust opening 21 (FIGS. 2-5), there will be a horizontal force applied to the vehicle as a result of a three-fold steering condition.

One such steering force will result from external unbalanced pressure condition. For example, when the control stick 45 is pivoted to the right (FIG. 1) the control disc 35 will be moved to the left (FIG. 3) so as to partially or completely close the annular exhaust opening 21 on the left side of the vehicle.

Figure 3:
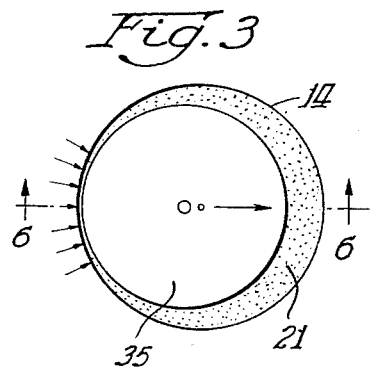
FIG. 3 is a schematic bottom view of the vehicle showing the steering disc in an off-center position with the vehicle urged in the direction of the arrow.
Figure 4:
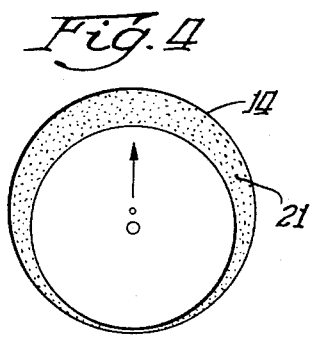
FIG. 4 is a schematic bottom view of the vehicle showing the steering disc in an off-center position with the vehicle urged in the direction of the arrow.
Figure 5:
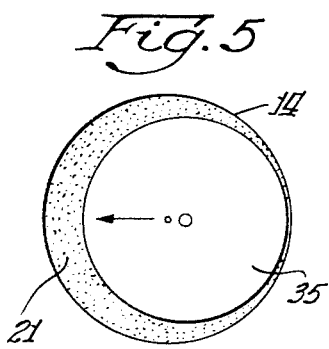
FIG. 5 is a schematic bottom view of the vehicle showing the steering disc in an off-center position with the vehicle urged in the direction of the arrow.

The air flow into the left portion of the inlet 20 will be restricted resulting in an air pressure adjacent the left side of the vehicle which approaches atmospheric pressure. The air flow into the right portion of the inlet 20 will be totally unrestricted by the disc 35 with the result that the air flowing into the right side of the vehicle will be of much greater velocity than that flowing into the left side of the vehicle. There is a vacuum created adjacent the right side of the vehicle due to the high velocity of the air flow while the left side of the vehicle will be subjected to a pressure, which approaches atmospheric pressure, due to the low velocity air flow into the left side of the vehicle. As a consequence of this pressure differential, the vehicle will be urged to the right (FIGS. 1 and 3).

Figure 6:
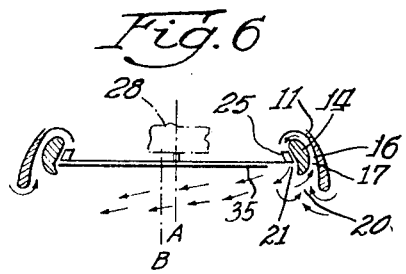
FIG. 6 is a sectional side view of the vehicle taken along line 6—6 of FIG. 3 showing the direction of air flow with the disc in an off-center position.

A second steering force results from an internal unbalanced ram effect. For example, when the control disc 35 is moved to the left (FIG. 3) as above, there will be little or no air flow adjacent the left portion of the exhaust opening 21 and there will be an increased air flow from the open portion on the right side of the vehicle (FIG. 6). Thus, air flowing through the duct 16 at the right side of the vehicle will be directed inwardly and downwardly to the left toward the center of the chamber with a resulting ram effect tending to urge the vehicle to the right. The left side of the vehicle will be void of any equivalent ram effect with the result that there will be an unbalanced ram effect created beneath the vehicle which will cause the vehicle to move to the right. This unbalanced ram effect augments the previously described unbalanced external pressure steering effect.

A third steering force will result from a center-of-lift shift. For example, when the control disc 35 is moved to the left (FIG. 3) there will be an increased air velocity in the right portion of the chamber 12 due to the increase in the volume of air directed inwardly along the upper surface of the chamber 12 (FIG. 6). Conversely, inasmuch as less air will flow out of the exhaust opening 21 adjacent the left side of the vehicle, (FIG. 6) there will be a high pressure area mass formed in the left half of the chamber 12 as a result of the air trapped within the chamber. This changing or shifting of the pressure within the chamber will result in a corresponding unbalance or shifting of the center of lift from a point A (FIG. 6) in the center of the vehicle to a point B on the high pressure side of the vehicle. The center of gravity of the vehicle is assumed to be in the center of the vehicle for purposes of illustration and the offset lifting force will cause the vehicle to tilt to the right when the disc is moved to the left. Under these unbalance conditions of support, the vehicle will tend to slide down to the right on the supporting air mass toward the low side of the support, the vehicle will tend to slide down to the right This center-of-lift shift will augment the previously described external pressure differential steering effect and the internal ram differential steering effect.

Thus, the vehicle may be steered in any direction by causing the control stick 45 to move the control disc to the required position (FIGS. 2–5) or any intermediate position thereof. When the disc is in any position other than the neutral position (FIG. 2) the aggregate steering effect of the three steering forces will combine to give a corresponding lateral movement. It should be noted that the disc 35 may be positioned to correct for a shift in the center of gravity of the vehicle. In this respect, the positioning of the disc facilitates the equilibrium or "trim" of the vehicle even under conditions of non-uniform loading.

Applicant wishes to point out that his invention is not limited to a vehicle having a circular body with a corresponding circular control disc as illustrated (FIGS. 2–5). More particularly, the configuration thereof could be either circular, oval or rectangular, or a modification or combination thereof. The circular configuration has been illustrated in this application as an appropriate representation of applicant's invention which could assume the other configurations.

While I have described my invention in connection with certain specific constructions and arrangements, it is to be understood that this is by way of illustration and not by way of limitation and the scope of my invention is defined solely by the appended claims which should be construed as broadly as the prior art will permit.

What is claimed is:

1. In a vehicle comprising the combination of a body having a lower peripheral portion defining a downwardly opening chamber, said body being formed with a duct therein having an inlet and an outlet opening in said chamber, said inlet being positioned inwardly and upwardly adjacent said lower peripheral portion and said outlet being spaced inwardly and upwardly from said inlet, and means for drawing air through said duct into said chamber for providing a pressurized air mass in said chamber to support the vehicle.

2. In a vehicle comprising a combination of a body having a lower peripheral portion defining a downwardly opening chamber, said body being formed with a duct therein having a substantially vertical inlet portion opening downwardly into said chamber and positioned inwardly and upwardly adjacent the lower peripheral portion of said body, said body being formed with a substantially vertical duct outlet portion spaced inwardly and upwardly from said inlet portion and opening inwardly and downwardly into said chamber, and means for drawing air from the atmosphere through said duct inlet portion and for re-circulating air through said duct from said chamber for providing a pressurized air mass in said chamber to support the vehicle.

3. In a vehicle comprising the combination of a body having a lower peripheral portion defining a downwardly opening chamber, said body being formed to define a duct therein having an inlet and an outlet opening in said chamber, said duct inlet being positioned inwardly and upwardly adjacent said lower peripheral portion and the outlet being spaced inwardly and upwardly from said inlet, means for drawing air through said duct into said chamber for providing a pressurized air mass in said chamber to support the vehicle, and means for selectively controlling the flow of air out of said duct outlet to steer the vehicle.

4. In a vehicle comprising the combination of a body having a lower peripheral portion defining a downwardly opening chamber, said body being formed to define a duct therein having an inlet and an outlet opening in said chamber, said duct inlet bing positioned inwardly and upwardly adjacent said lower peripheral portion and the outlet being spaced inwardly and upwardly from said inlet, means for drawing air through said duct into said chamber for providing a pressurized air mass in said chamber to support the vehicle, and omni-directional means for selectively controlling the flow of air out of said duct outlet to steer the vehicle.

5. In a vehicle comprising the combination of a body having a lower peripheral portion defining a downwardly opening chamber, said body being formed to define a duct therein having a substantially vertical intake portion with an inlet opening positioned inwardly and upwardly adjacent said lower peripheral portion and having a substantially vertical exhaust portion terminating in an outlet opening spaced inwardly and upwardly from said inlet opening in said chamber, means for drawing air through said duct, said body being formed at the duct outlet for directing air inwardly and downwardly into said chamber for providing a pressurized air mass in said chamber to support the vehicle, and means for selectively controlling the flow of air out of said duct outlet to steer the vehicle.

6. In a vehicle comprising a combination of a body having a lower peripheral portion defining a downwardly opening annular chamber, said body being formed to define a duct therein having a substantially vertical intake portion originating in an annular inlet opening positioned inwardly and upwardly adjacent said lower peripheral portion and having a substantially vertical exhaust portion terminating in an annular outlet opening spaced inwardly and upwardly from said inlet opening in said chamber, and means for drawing air through said duct, said body being formed at said duct outlet for directing air inwardly and downwardly into said chamber for providing a pressurized air mass in said chamber to support the vehicle.

7. In a vehicle comprising the combination of a body having a lower peripheral portion defining a downwardly opening annular chamber, said body being formed to define an annular groove therein opening into said chamber, an annular stator means for rigidly suspending said stator in said groove, said stator and groove defining a duct in said groove having an inlet adjacent said lower peripheral portion and an outlet spaced inwardly from said inlet, means for drawing air through said duct, said body being formed at said duct outlet for directing air inwardly and downwardly into said chamber for providing a pressurized air mass in said chamber to support the vehicle, and means for selectively controlling the flow of air out of the duct outlet to steer the vehicle.

8. In a vehicle comprising the combination of a body having a lower peripheral portion defining a downwardly opening chamber, said body having an annular groove therein opening into said chamber adjacent said periphery of said body, an annular stator, means for rigidly suspending said stator in said groove, said stator and groove defining an annular duct in said groove having a subntantially vertical intake portion originating in an inlet adjacent said lower peripheral portion and having a substantially vertical exhaust portion terminating in an outlet spaced inwardly from said inlet in said chamber, means adapted to draw air through said duct, said body being formed at said duct outlet for directing air inwardly and downwardly into said chamber for providing a pressurized air mass in said chamber to support the vehicle, and means for selectively controlling the flow of air out of the duct outlet to steer the vehicle.

9. In a vehicle comprising the combination of a body having a lower peripheral portion defining a downwardly opening chamber, said body having an annular groove therein opening into said chamber adjacent said peripheral portion, an annular stator, means for rigidly suspending said stator in said groove, said stator and groove defining an annular duct in said groove having a substantially vertical intake portion originating in an inlet opening adjacent said lower peripheral portion and having a substantially vertical exhaust portion terminating in an outlet spaced inwardly from said inlet in the chamber, means for drawing air through said duct, said body being formed at said duct outlet for directing air inwardly and downwardly into the chamber for providing a pressurized air mass in the chamber to support the vehicle, and a plate slidably mounted on said stator within said chamber movable directly in any direction in a given plane for selectively closing portions of said duct outlet to steer the vehicle.

10. In a vehicle comprising the combination of a body having a lower peripheral portion defining a downwardly opening annular chamber, said body being formed to define an annular duct therein having an inlet and an outlet opening in said chamber, said inlet being adjacent said lower peripheral portion and said outlet being spaced inwardly from said inlet, means for drawing air through said duct, said body being formed at said duct outlet for directing air inwardly and downwardly into said chamber for providing a pressurized air mass in said chamber to support the vehicle, and a plate slidably mounted on said body within said chamber and adapted to be positioned on said vehicle for selectively closing portions of said duct outlet opening to steer the vehicle.

11. In a vehicle comprising the combination of a body having a lower peripheral portion defining a downwardly opening chamber, said body being formed to define an annular groove therein opening into said chamber an annular core positioned in the annular groove, body means for rigidly suspending said core in said groove, said core and groove defining a duct in said groove having an inlet adjacent said lower peripheral portion and an outlet spaced inwardly from said inlet in said chamber, means adapted to draw air through said duct, said core being formed at said duct outlet for directing air inwardly and downwardly into said chamber for providing a pressurized air mass in said chamber to support the vehicle, diffuser stators secured to said core in the duct outlet for directing the air radially, and a plate slidably mounted on said diffusor stators within said chamber for selectively closing portions of the outlet to steer the vehicle.

12. In a vehicle comprising the combination of an annular body having a lower peripheral portion defining a downwardly opening chamber, said body having an annular groove therein opening into said chamber adjacent the periphery of said body, an annular core, means for rigidly suspending said core in said groove, said core and groove defining an annular duct in said groove concentric therewith and having a substantially vertical intake portion with an inlet adjacent the lower outer peripheral portion and having an exhaust portion terminating in an outlet spaced radially inward from said inlet in said chamber, means for drawing air through said duct, said core and body being formed at the duct outlet for directing air inwardly and downwardly into the chamber for providing a pressurized air mass in said chamber to support the vehicle, and a plate slidably mounted on said core within said chamber for selectively closing portions of the duct outlet to steer the vehicle.

References Cited

UNITED STATES PATENTS

| 2,838,257 | 6/1958 | Wibault | 180—1 |
| 3,050,146 | 8/1962 | Crim | 180—7 |

FOREIGN PATENTS

| 219,133 | 1/1959 | Australia. |
| 1,240,721 | 8/1960 | France. |

A. HARRY LEVY, *Primary Examiner.*

U.S. Cl. X.R.

180—130

U.S. DEPARTMENT OF COMMERCE

PATENT OFFICE

Washington, D.C. 20231

UNITED STATES PATENT OFFICE

CERTIFICATE OF CORRECTION

Patent No. 3,438,458 April 15, 19

Anthony C. Mamo

It is certified that error appears in the above identified patent and that said Letters Patent are hereby corrected as shown below:

Column 7, line 18, "ntantially" should read -- stantially --. Column line 21, "diffusor" should read -- diffuser --.

Signed and sealed this 14th day of April 1970.

(SEAL)
Attest:

Edward M. Fletcher, Jr.

Attesting Officer

WILLIAM E. SCHUYLER, JI

Commissioner of Patent